United States Patent
Narita

(10) Patent No.: US 11,886,945 B2
(45) Date of Patent: Jan. 30, 2024

(54) NON-TRANSITORY COMPUTER-READABLE MEDIUM STORING SUPPORT PROGRAM

(71) Applicant: BROTHER KOGYO KABUSHIKI KAISHA, Nagoya (JP)

(72) Inventor: Kenju Narita, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 17/933,539

(22) Filed: Sep. 20, 2022

(65) Prior Publication Data

US 2023/0100715 A1 Mar. 30, 2023

(30) Foreign Application Priority Data

Sep. 29, 2021 (JP) .................................. 2021-159239

(51) Int. Cl.
*G06K 15/02* (2006.01)

(52) U.S. Cl.
CPC ..... *G06K 15/1865* (2013.01); *G06K 15/1836* (2013.01)

(58) Field of Classification Search
None
See application file for complete search history.

(56) References Cited

U.S. PATENT DOCUMENTS

| 2002/0016799 A1* | 2/2002 | Nakagiri | G06K 15/00 |
| | | | 715/246 |
| 2008/0266599 A1 | 10/2008 | Suzuki | |
| 2014/0063530 A1* | 3/2014 | Hara | G06K 15/1863 |
| | | | 358/1.13 |

(Continued)

FOREIGN PATENT DOCUMENTS

| JP | 2002-248817 A | 9/2002 |
| JP | 2005-182486 A | 7/2005 |

(Continued)

OTHER PUBLICATIONS

International Search Report and Written Opinion dated Nov. 8, 2022 from related application PCT/JP2022/034172 together with English language translations.

*Primary Examiner* — Dov Popovici
(74) *Attorney, Agent, or Firm* — Scully, Scott, Murphy & Presser, PC

(57) ABSTRACT

A non-transitory computer-readable medium storing a support program readable by a computer of an information processing device, the support program corresponding to a printer connected to the information processing device and supporting a general-purpose print program pre-installed in an operating system of the information processing device, the support program, when executed by the computer, causes the computer to perform: based on a print instruction being output from an application program installed in the information processing device and transferred to the general-purpose print program to cause the printer to perform printing, receiving intermediate image data according to the (Continued)

print instruction from the operating system; generating rasterized raster data based on the received intermediate image data; compressing the generated raster data; and transmitting print data based on the compressed raster data to the printer.

10 Claims, 5 Drawing Sheets

(56) References Cited

U.S. PATENT DOCUMENTS

| | | | |
|---|---|---|---|
| 2014/0063554 A1* | 3/2014 | Hara | G06K 15/181 |
| | | | 358/1.16 |
| 2017/0061267 A1 | 3/2017 | Wakasa | |
| 2023/0102837 A1* | 3/2023 | Narita | G06F 3/1205 |
| | | | 358/1.15 |

FOREIGN PATENT DOCUMENTS

| | | |
|---|---|---|
| JP | 2008-276531 A | 11/2008 |
| JP | 2017045247 A | 3/2017 |

* cited by examiner

NON-TRANSITORY COMPUTER-READABLE MEDIUM STORING SUPPORT PROGRAM

REFERENCE TO RELATED APPLICATIONS

This application claims priority from Japanese Patent Application No. 2021-159239 filed on Sep. 29, 2021. The entire content of the priority application is incorporated herein by reference.

BACKGROUND ART

A related art discloses a technique in which a printer driver compresses data transmitted to a printer. For example, the related art discloses a printer driver that causes a computer to generate print data and transmit the print data to a printer, wherein the printer driver compresses large-sized image data.

DESCRIPTION

In recent years, a technique for controlling a printer by a print program built into the operating system (abbreviated to "OS") as a standard without using a printer driver has been put into practical use. In this technology, when the OS associates a printer with an OS standard print program and subsequently receives a print instruction for the printer, printing by the OS standard print program becomes possible without using a printer driver.

However, the OS standard general-purpose print program described above may not support some of the functions implemented in the conventional printer driver. For example, the OS standard general-purpose print program may not have the function of compressing the image data as disclosed in the above-described related art. Thus, it takes time to transmit the data to the printer, and the start of printing may be delayed.

The present specification discloses a technique capable of reducing a delay in the start of printing even if an information processing device in which an OS standard general-purpose print program is installed is passed through the OS standard general-purpose print program.

A non-transitory computer-readable medium storing a support program readable by a computer of an information processing device, the support program corresponding to a printer connected to the information processing device and supporting a general-purpose print program pre-installed in an operating system of the information processing device, the support program, when executed by the computer, causes the computer to perform: based on a print instruction being output from an application program installed in the information processing device and transferred to the general-purpose print program to cause the printer to perform printing, receiving intermediate image data according to the print instruction from the operating system; generating rasterized raster data based on the intermediate image data received from the operating system; compressing the generated raster data; and transmitting print data based on the compressed raster data to the printer.

According to the non-transitory computer-readable medium storing the support program disclosed in the present specification, the information processing device compresses raster data indicating an image to be printed by the support program when a print instruction is given to the general-purpose print program and transmits the print data based on the compressed raster data to the printer. As a result, the print data having a smaller size is transmitted to the printer as compared with the case where the print data based on the uncompressed raster data is transmitted to the printer. Therefore, a delay is unlikely to occur in the transmission and reception of print data, and even if the general-purpose print program of the operating system does not support the data compression function, the delay in the start of printing can be reduced.

A control method for achieving the above program and a non-transitory computer-readable storage medium for storing the program are also novel and useful.

According to the technique disclosed in the present specification, a technique capable of reducing a delay in the start of printing even if an information processing device installed with an OS standard general-purpose print program is passed through the OS standard general-purpose print program is achieved.

Hereinafter, a personal computer (hereinafter referred to as "PC") that uses a support program of the present illustrative embodiment will be described in detail with reference to the attached drawings. The present specification discloses a support program executed by a PC connected to a printer having a printing function.

Overall Configuration

Figure 1:
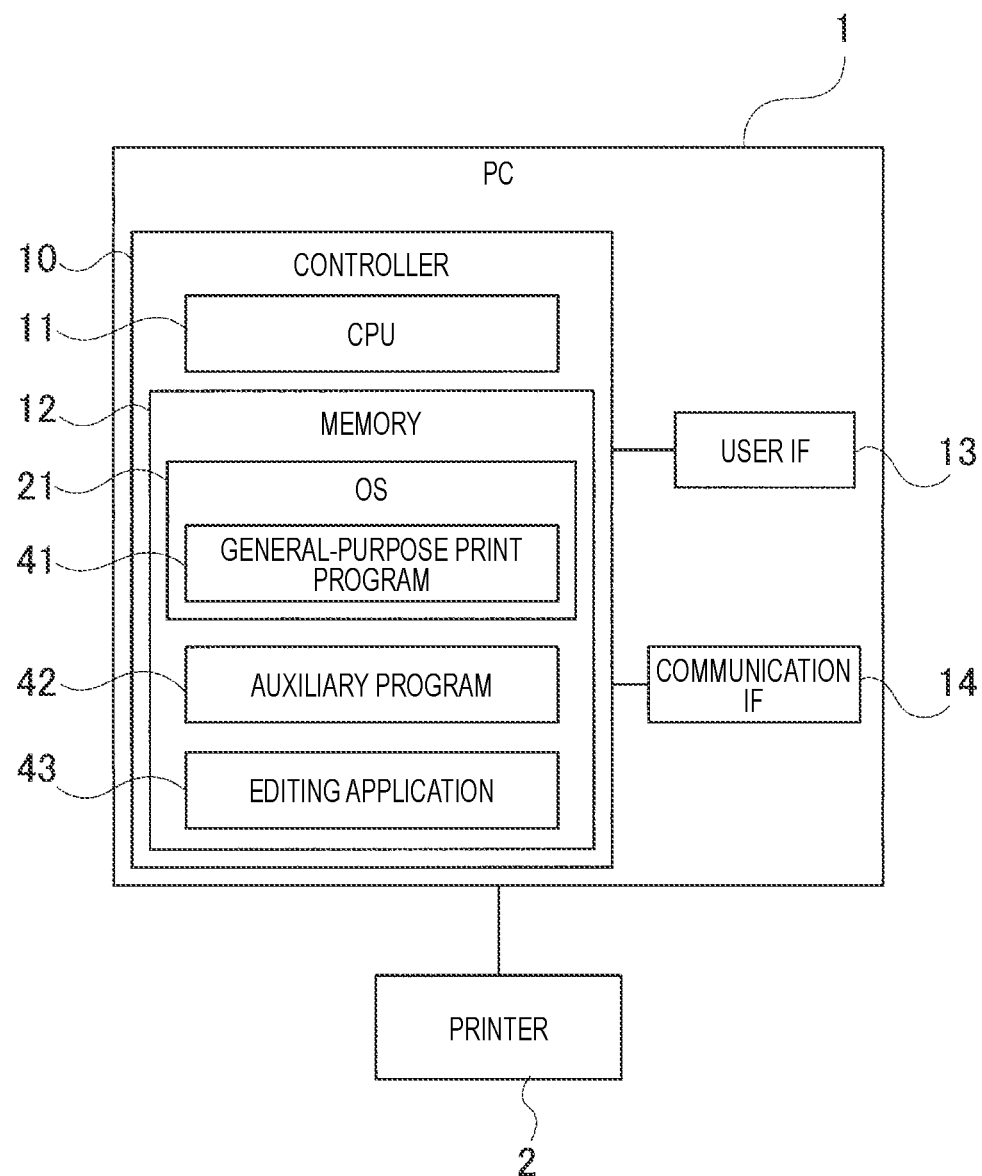
FIG. 1 is a block diagram showing an outline of the electrical configuration of a PC.

As shown in FIG. 1, a PC 1 of the present illustrative embodiment includes a controller 10 including a CPU (an abbreviation of "central processing unit") 11, and a memory 12. The PC 1 is an example of an information processing device. The CPU 11 is an example of a computer. Further, the PC 1 includes a user interface (hereinafter referred to as "user IF") 13 and a communication interface (hereinafter referred to as "communication IF") 14, which are electrically connected to the controller 10. The controller 10 in FIG. 1 is a general term for hardware and software used for controlling the PC 1 and does not necessarily represent single hardware that actually exists in the PC 1.

The CPU 11 executes various processes according to the program read from the memory 12 and based on the user's operation. Various programs including various application programs (hereinafter referred to as "applications") and various data are stored in the memory 12. The memory 12 is also used as a work area when various processes are executed. A buffer included in the CPU 11 is also an example of the memory. An example of the memory 12 is not limited to the ROM (an abbreviation of "read only memory"), RAM (an abbreviation of "random access memory"), HDD (an abbreviation of "hard disk drive"), and the like built in the PC 1 and may be a storage medium that can be read and written by the CPU 11, such as a recording medium such as a CD-ROM or a DVD-ROM.

The user IF 13 includes hardware that displays a screen for notifying the user of information and hardware that receives operations by the user. The user IF 13 may be a set including a display capable of displaying information, and a mouse, keyboard, or the like having an input reception function or may be a touch panel having a display function and an input reception function.

The communication IF 14 includes hardware for communicating with an external device such as a printer 2. The communication standard of the communication IF 14 is Ethernet (registered trademark), Wi-Fi (registered trademark), USB (an abbreviation of "universal serial bus"), and the like. The PC 1 may include a plurality of communication IFs 14 corresponding to a plurality of communication standards.

As shown in FIG. 1, the memory 12 of the PC 1 stores an operating system (hereinafter referred to as "OS") 21 containing a general-purpose print program 41, an auxiliary program 42, and an editing application 43. The auxiliary program 42 is an example of a support program. The editing application 43 is an example of an application program. The OS 21 is, for example, Windows (registered trademark), macOS (registered trademark), Linux (registered trademark), iOS (registered trademark), or Android (registered trademark).

The general-purpose print program 41 is an OS standard program for causing various printers such as the printer 2 to execute printing based on a user's instruction. The general-purpose print program 41 of the present illustrative embodiment is a program including the function of generating intermediate image data based on the image data to be printed.

The general-purpose print program 41 supports functions that can be commonly used by printers of a plurality of types of models provided by vendors of various printers. The general-purpose print program 41 does not correspond to all the functions unique to various printers, and the supporting functions are limited to general-purpose ones.

The auxiliary program 42 is a program or a group of programs that execute the processing based on the instruction from the OS 21 accompanying the processing of the general-purpose print program 41 and is an application that supports the control of the target hardware. The auxiliary program 42 of the present illustrative embodiment corresponds to the model of the printer 2 connected to the PC 1 and is started from the general-purpose print program 41, for example, when the general-purpose print program 41 is used to receive an instruction to cause the printer 2 to perform printing. The auxiliary program 42 is called, for example, a print support application (abbreviated to "PSA").

The auxiliary program 42 can receive a plurality of types of commands from the general-purpose print program 41 and executes various processes based on the received commands. The auxiliary program 42 may be a combination of a plurality of programs, each of which receives an execution command, or may be a single program that can execute different processes according to the command.

The auxiliary program may be a program prepared for each printer type by the printer vendor. For example, an auxiliary program for an inkjet printer and an auxiliary program for a laser printer may be prepared respectively. For example, when a new printer is connected to the PC 1, the OS 21 of the PC 1 downloads an appropriate auxiliary program from a server or the like according to the type of the connected printer and installs the downloaded auxiliary program into its own device. Then, the OS 21 stores the identification information of the installed auxiliary program in association with the printer information of the newly connected printer in the memory 12. There may be an auxiliary program prepared not only for each printer type but also for each printer model or each printer model series.

The editing application 43 is, for example, an application for creating and editing image data and document data. The editing application 43 may be, for example, Word or PowerPoint manufactured by Microsoft (registered trademark), or may be an application provided by the vendor of the printer 2. The editing application 43 accepts a user operation including an instruction to cause the printer 2 to perform a predetermined operation. Specifically, the editing application 43 receives, for example, a print execution instruction to cause the printer 2 to execute printing via the user IF 13.

The printer 2 of the present illustrative embodiment is a device having a printing function. The PC 1 can communicate with the printer 2 via the communication IF 14. The printer 2 receives print data from, for example, the PC 1 or the like, and executes printing based on the received print data.

Printing Procedure

Subsequently, the printing procedure including the operation of the auxiliary program 42 of the present illustrative embodiment will be described with reference to the sequence diagrams in FIGS. 2A and 2B. The general-purpose print program 41 of the present illustrative embodiment does not support the function of compressing raster data. Therefore, the procedure described below is a procedure for causing the printer 2 to perform printing via the general-purpose print program 41, and the procedure includes the processing of compressing the raster data indicating the image to be printed by the auxiliary program 42.

Figure 2A:
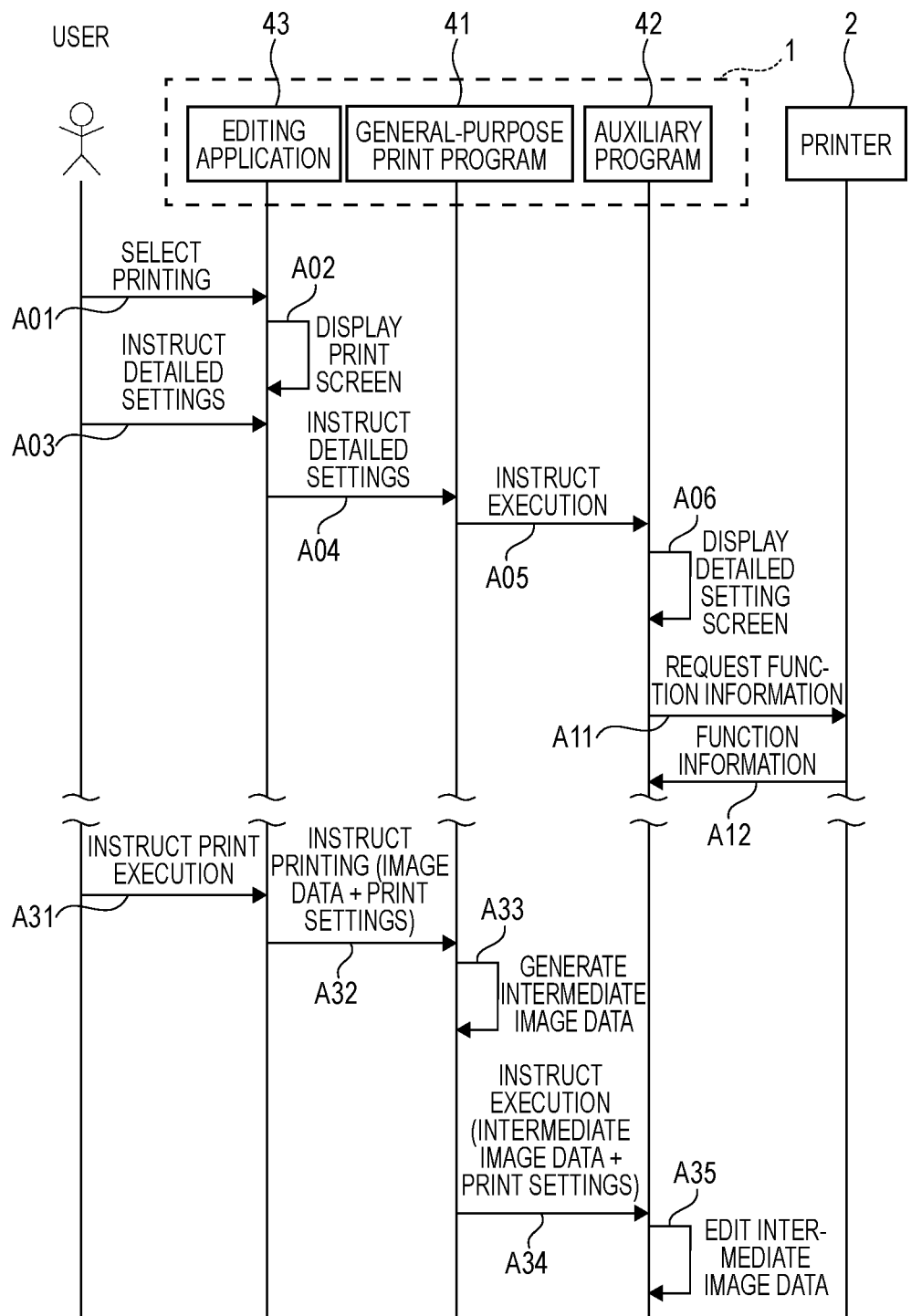
FIGS. 2A and 2B are sequence diagrams showing an example of a procedure for printing operation by each program in the illustrative embodiment.
Figure 2B:
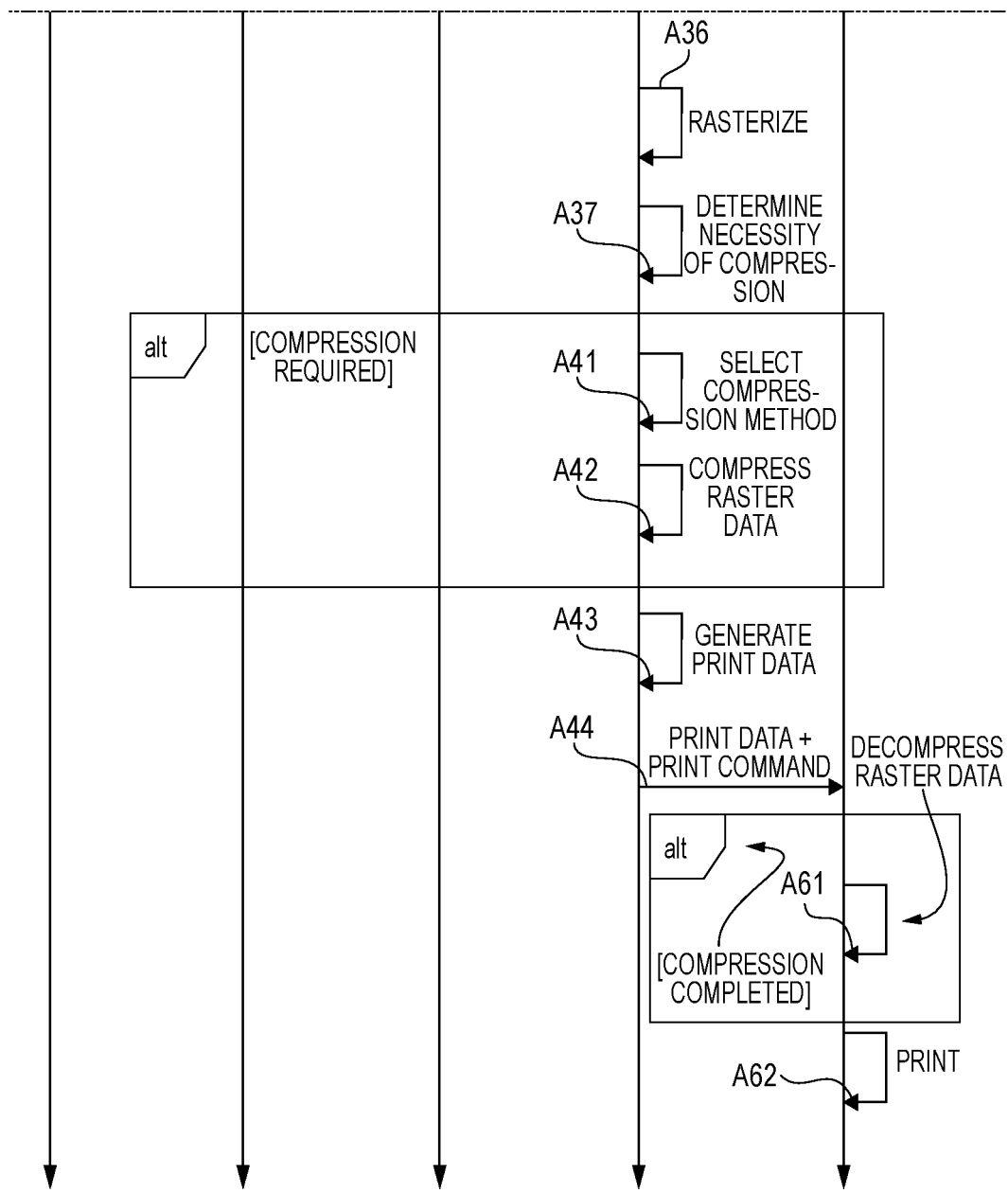

FIGS. 2A and 2B show the operation in an application that receives a print instruction such as the editing application 43 when a print execution instruction to cause the printer 2 to perform printing using the general-purpose print program 41 is received, and the auxiliary program 42 corresponding to the printer 2 is installed in the PC 1.

Each processing step in the present illustrative embodiment basically indicates the processing of the CPU 11 according to a command described in a program such as the auxiliary program 42. The processing by the CPU 11 also includes hardware control using the API of the OS 21. In the present specification, the operation of each program will be described with the detailed description of the OS 21 omitted. Incidentally, "obtain" and "receive" may be used as a concept that does not necessarily require a request.

The editing application 43 accepts the creation and editing of sentences, charts, and the like based on the user's instructions. When the editing application 43 receives an instruction regarding the printing of the selected sentences or the like (A01), the editing application 43 displays a print screen for receiving the instruction by the user on the user IF 13 (A02). The editing application 43 receives, for example, a print execution instruction, a basic print setting instruction, and an instruction to start accepting detailed print settings on the print screen.

When the editing application 43 receives an instruction to start accepting detailed print settings while the printer 2 is selected on the displayed print screen (A03), the editing application 43 passes the received detailed setting instruction information to the OS 21. When the OS 21 receives an instruction for detailed settings related to printing using the general-purpose print program 41, the OS 21 executes the general-purpose print program 41 and passes an instruction to start accepting detailed print settings to the general-purpose print program 41 (A04). When the general-purpose print program 41 receives the instruction to start accepting the detailed print settings, the general-purpose print program 41 passes the execution instruction to accept detailed print settings to the auxiliary program 42 corresponding to the printer 2 which is the selected printer (A05).

The auxiliary program 42 starts the operation based on the execution instruction from the general-purpose print program 41 and displays a setting screen for accepting an input operation of detailed print settings on the user IF 13 (A06).

The auxiliary program 42 displays, for example, a setting screen that accepts compatible detailed settings based on the model information of the printer 2 and accepts user operations.

Further, the auxiliary program 42 requests the function information from the printer 2 (A11) via the communication IF 14 after starting the display of the setting screen in A06 and receives the function information from the printer 2 (A12). The function information includes information indicating the model of the printer 2 and information indicating the presence or absence of the function of the printer 2. The information indicating the presence or absence of the function of the printer 2 includes, for example, information on whether the printer has a decompression function for compressed data, and in this case, information indicating the type of compression method that can be supported as the decompression function is also included. The auxiliary program 42 stores the function information of the printer 2 in the memory 12. A12 is an example of the capability obtainment process.

Communication between the auxiliary program 42 and the printer 2 may be performed, for example, via the OS 21, or the auxiliary program 42 may directly communicate with the printer 2 using a MIB (abbreviation of Management Information Base). When the communication is performed via the OS 21, the auxiliary program 42 and the printer 2 communicate with each other according to the communication protocol of the OS 21 such as IPP (abbreviation of Internet Printing Protocol).

After that, when the instruction to end the detailed setting is received, the auxiliary program 42 ends the display of the setting screen and passes the selected print setting and the end notification to the general-purpose print program 41. Upon receiving the end notification from the auxiliary program 42, the general-purpose print program 41 passes the end notification to the editing application 43.

Next, when the editing application 43 receives the print execution instruction by the user on the print screen (A31), the editing application 43 passes the print instruction to the general-purpose print program 41 (A32). The general-purpose print program 41 obtains information indicating image data to be printed and information indicating print settings in the print instruction.

The general-purpose print program 41 generates intermediate image data by converting the format of the image data included in the received print instruction into the format of the intermediate image data (A33) and generates a print job including the intermediate image data. The image data included in the editing application 43 is of various types, and the general-purpose print program 41 converts the received image data into intermediate image data suitable for generating print data. If the image data included in the print instruction is data suitable for generating the print data, the generation of the intermediate image data may be omitted and the image data may be used as the intermediate image data. The intermediate image data is, for example, XPS data.

The general-purpose print program 41 further outputs an execution instruction to the auxiliary program 42 (A34) and operates the auxiliary program 42. In the execution instruction, the generated intermediate image data and the print setting information are passed to the auxiliary program 42. Since the auxiliary program 42 obtains the intermediate image data indicating the image to be printed from the general-purpose print program 41 included in the OS 21 in A34, A34 is an example of the obtainment process.

The auxiliary program 42 edits the intermediate image data based on the print settings (A35). For example, if the print setting includes a compositing instruction, a composite image obtained by compositing the content shown in the compositing information with the image shown in the intermediate image data based on the intermediate image data received in A34 and the compositing information is generated. The content to be composited may be an image, a figure, or a character. Also, if the print settings include an aggregation setting for aggregating images of multiple pages onto a single sheet, the so-called Nin1 setting, the image on each page shown in the intermediate image data is resized to be small to generate an aggregated image in which images corresponding to N pages are arranged so as to fit on one sheet, that is, N pages of images are aggregated into one page of images.

After that, the auxiliary program 42 executes rasterization based on the intermediate image data edited in A35 to generate raster data (A36). By rasterizing with the auxiliary program 42, the degree of freedom is large as compared with the case of rasterizing with the general-purpose print program 41, and the possibility that print data suitable for printing by the printer 2 is generated increases. A36 is an example of the generation process.

The auxiliary program 42 further determines whether compression is necessary for the raster data generated in A36 (A37). In the present illustrative embodiment, the determination as to whether compression is necessary is determined based on at least one requirement among the capability of the printer, the image to be printed, and the print settings.

When determining the necessity of compression based on the capability of the printer, the auxiliary program 42 determines that compression is not necessary if, for example, the printer 2 does not have a decompression function for compressed data. Further, even if the printer 2 has a decompression function for compressed data, if the auxiliary program 42 does not support the compression format that can be decompressed by the printer 2, it is determined that compression is unnecessary. For capability of the printer 2, the function information obtained in A12 is used. Of the function information, the information indicating whether the decompression function is provided and the information indicating the supported compression formats may be information directly indicating them and may be information indirectly indicating them by indicating a model. If the capability of the printer 2 has not been obtained at the stage of executing A37, the capability of the printer 2 may be obtained before executing A37. If the image compressed by the auxiliary program 42 cannot be decompressed by the printer 2, the compressed image cannot be transmitted, and thus compression is unnecessary.

When determining the necessity of compression based on the image to be printed, the auxiliary program 42 determines that compression is unnecessary, for example, if the size of the intermediate image data is smaller than a threshold value or the image shown in the intermediate image data is monochrome. If the size of the intermediate image data is smaller than the threshold value, it is assumed that the print data based on the rasterized raster data will also be smaller, the communication load will be small without compression, and the difference in the size of the print data before and after compression will be small. Even when the image is monochrome, the size of the print data is assumed to be small. From this, it is determined that compression is unnecessary.

When determining the necessity of compression based on the print settings, the auxiliary program 42 determines that compression is unnecessary, for example, if the original size is small or the resolution is low. If the original size is small or the resolution is low, it is assumed that the print data based on the rasterized raster data will also be small, the communication load will be small without compression, and the difference in the size of the print data before and after compression will be small. From this, it is determined that compression is unnecessary.

In A37, if it is determined that compression is unnecessary even for one of these requirements, it is determined that compression is unnecessary, and if it is not determined that compression is unnecessary for all the requirements, it is determined that compression is necessary. Incidentally, the determination requirement in A37 is not limited to the above-described ones. For example, if it is determined that compression is not necessary for more than one of the above requirements, it may be determined that compression is unnecessary, and if it is determined that compression is unnecessary for one of the above requirements, or it is not determined that compression is unnecessary for all the requirements, it may be determined that compression is necessary. Alternatively, if it is determined that compression is unnecessary for all the above-described requirements, it may be determined that compression is unnecessary, and if it is not determined that compression is unnecessary even for one of the above-described requirements, it may be determined that compression is necessary. Further, at least one requirement may be determined instead of determining all the above-described requirements.

When it is determined that compression is necessary (Alt: compression required), the auxiliary program 42 selects a compression method for compressing the raster data (A41). The auxiliary program 42 supports a plurality of compression methods such as gzip, gif, tiff, png, and the like. Therefore, a compression method that matches the compression method supported by the printer 2 is selected from the plurality of compression methods. The auxiliary program 42 supports a plurality of compression methods, and by selecting a compression method suitable for the printer to which the print data is transmitted, an appropriate compressed image can be transmitted for each printer.

After that, the auxiliary program 42 compresses the raster data by the selected compression method (A42). A42 is an example of the compression process. If it is necessary to convert an image from color to monochrome, the auxiliary program 42 may convert the image shown in the raster data from color to monochrome and then compress the converted raster data.

After A42, or when it is determined that compression is unnecessary, the auxiliary program 42 generates print data based on the raster data (A43). The raster data at this time is compressed raster data if it passes through A42, and is uncompressed raster data if it does not pass through A42. The print data generated in A43 is data in a format that can be used for printing by the printer 2, and is, for example, PDL data dedicated to the model of the printer 2. The print data generated by the auxiliary program 42 may be data in a format that can be used for printing on a printer other than the model of the printer 2.

The auxiliary program 42 transmits the print data generated in A43 to the printer 2 together with the print command instructing the execution of printing (A44). A44 when transmitting print data based on compressed raster data is an example of the transmission process.

The printer 2 that has received the print data and the print command from the auxiliary program 42 decompresses the raster data included in the print data if the raster data included in the print data has been compressed (Alt: compression completed) based on the received print command (A61). Then, the printing of the image shown in the received print data is executed (A62) and the printing procedure is completed.

Further, when the print data is transmitted to the printer 2, the auxiliary program 42 responds to the general-purpose print program 41 with a transmission completion code indicating that the transmission of the print data has been completed. The general-purpose print program 41, which has received the code indicating that the transmission has been completed, does not perform the process for transmitting the print data to the printer 2, and the printing procedure ends.

As described in detail above, when there is a print instruction to the general-purpose print program 41 and compression of the raster data indicating the image to be printed is necessary, the PC 1 compresses the raster data by the auxiliary program 42 and then, transmits the print data based on the compressed raster data to the printer 2. As a result, print data having a smaller size is transmitted to the printer 2 as compared with the case where the print data based on the uncompressed raster data is transmitted to the printer 2. Therefore, a delay is unlikely to occur in the transmission and reception of print data, and even if the general-purpose print program 41 does not support the data compression function, the delay in the start of printing can be reduced.

On the other hand, in the PC 1, if compression is not required, the auxiliary program 42 transmits the print data without compressing the raster data, so that the printer 2 does not need to decompress the raster data, and the printer 2 can start printing immediately after receiving the data as compared with the case where the auxiliary program 42 compresses and transmits raster data to the printer 2.

Application Form

Figure 3A:
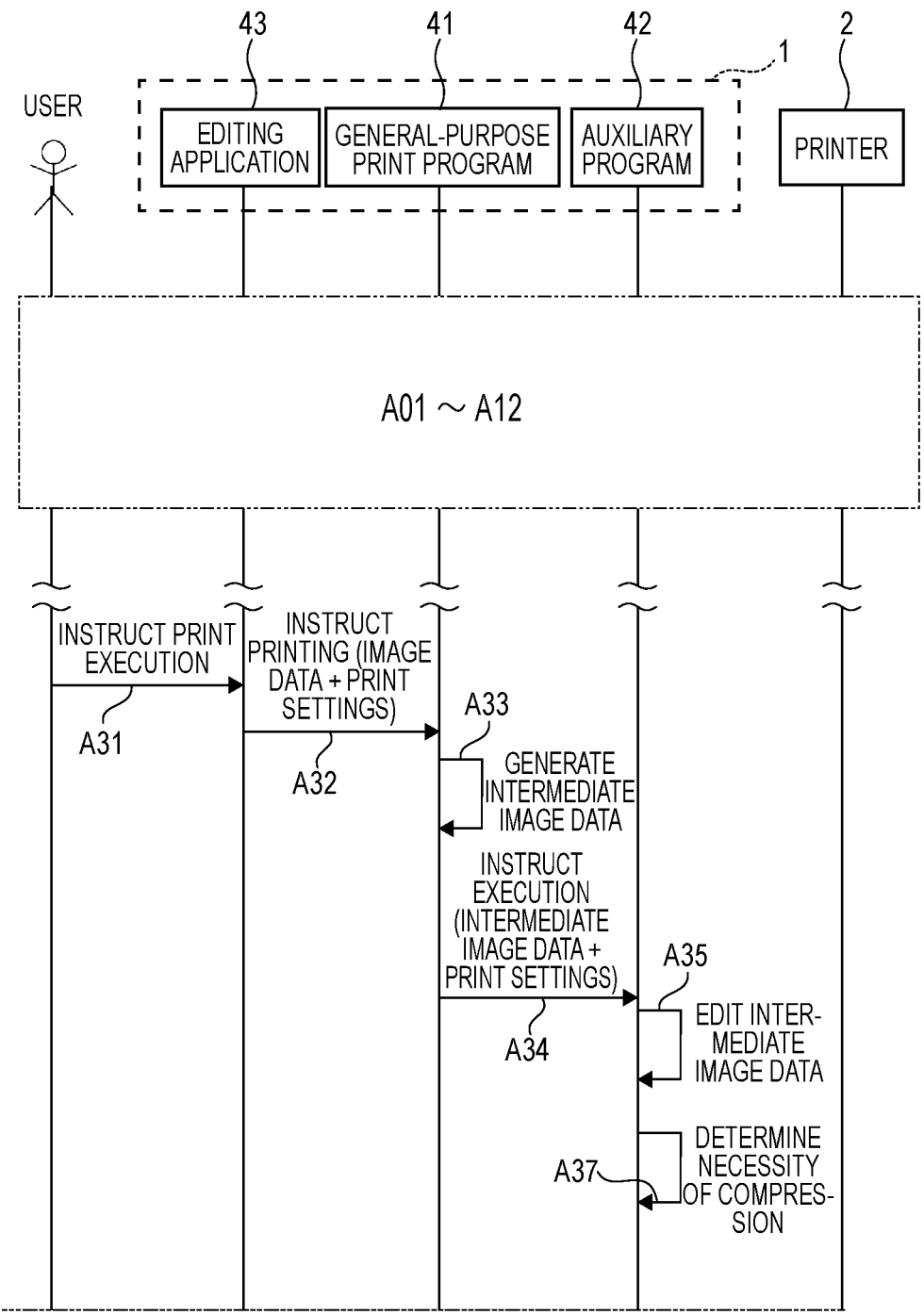
FIGS. 3A and 3B are sequence diagrams showing an example of a procedure of printing operation by each program in an application form.
Figure 3B:
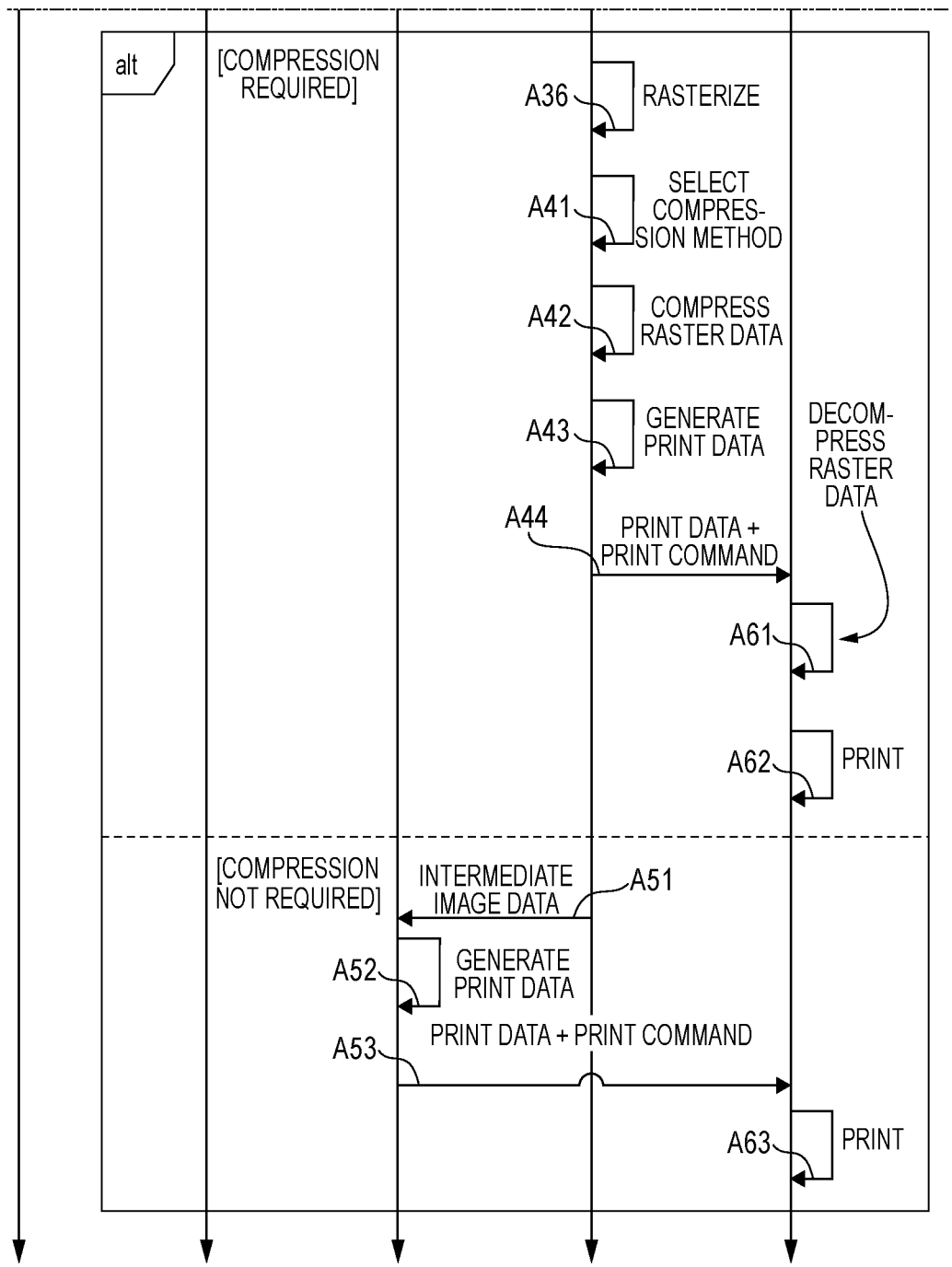

Next, an application form of the above-described printing procedure will be described with reference to the sequence diagrams in FIGS. 3A and 3B. In FIGS. 3A and 3B, the same process as the procedure shown in FIGS. 2A and 2B is assigned to the same number and the description thereof will be omitted. Further, in the application form, in the auxiliary program 42, the process after obtaining the intermediate image data and editing the intermediate image data is different from the procedure shown in FIGS. 2A and 2B. Therefore, in FIG. 3A, the illustrations of A01 to A12 shown in FIG. 2A are omitted, and in the description of the process of the application form, the processes up to A35 are omitted.

In the application form, after A36, before rasterizing the intermediate image data, it is determined whether the raster data needs to be compressed (A37). This determination may be the same as A37 shown in FIG. 2B.

When it is determined that compression is necessary (Alt: compression required), the auxiliary program 42 executes rasterization based on the intermediate image data edited in A35 and generates raster data (A36). The rasterization at this time may be the same as that of A36 shown in FIG. 2B. In the application form, rasterization is performed when it is determined that compression is necessary. In this respect, it is different from the illustrative embodiment in which the auxiliary program 42 performs rasterization regardless of the necessity of compression.

After that, the auxiliary program 42 selects a compression method for compressing the raster data (A41) and compresses the raster data with the selected compression method (A42). Further, print data is generated based on the compressed raster data (A43), and the generated print data is transmitted to the printer 2 together with a print command instructing the execution of printing (A44).

On the other hand, when it is determined that compression is unnecessary (Alt: compression not required), the auxiliary program 42 passes the intermediate image data edited in A35 to the general-purpose print program 41 without performing rasterization (A51). The general-purpose print program 41 that has received the intermediate image data from the auxiliary program 42 performs rasterization based on the intermediate image data received from the auxiliary program 42 to generate raster data and generates print data based on the raster data (A52).

The print data generated by the general-purpose print program 41 is print data in a format that can be used for printing by various printers, and is, for example, PWG Raster data or PDF data. If rasterization is performed by the general-purpose print program 41, the processing of the auxiliary program 42 is small, and it is expected that the processing time of the auxiliary program 42 will not increase.

Then, the general-purpose print program 41 transmits the print data generated in A52 to the printer 2 together with the print command (A53). The printer 2 that has received the print data and the print command from the general-purpose print program 41 executes the printing of the image shown in the print data based on the received print command (A63). This ends the printing procedure.

In the application form shown in FIGS. 3A and 3B, when compression of raster data is not required, the auxiliary program 42 does not perform rasterization, but the general-purpose print program 41 performs rasterization and even transmits the print data. Therefore, the load based on the auxiliary program 42 is reduced.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the device connected to the PC 1 is not limited to a printer and may be a device having a printing function, such as a multifunction peripheral, a copying machine, or a facsimile machine. Further, the number of printers connected to the PC 1 is not limited to the example shown in the drawing and may be two or more.

Also, the illustrated display screens are examples and are not limited thereto. For example, the arrangement and expression of each image and each button are not limited to the illustrated examples.

Further, in the above-described illustrative embodiment, the auxiliary program 42 supports a plurality of compression methods, but only one compression method may be supported and the raster data may always be compressed by the compression method.

Further, in the above-described illustrative embodiment, only the printing operation is described in detail as the operation of the auxiliary program 42, but the auxiliary program 42 may have another role. Further, the program that executes the processing of the present illustrative embodiment is not limited to the auxiliary program 42 and may be any program that receives instructions from the OS 21 or the general-purpose print program 41 when printing using the general-purpose print program 41. For example, a print workflow application (Print Workflow) whose specifications have been released by Microsoft may be used.

Further, the execution timing of the auxiliary program 42 is not limited to the example of the illustrative embodiment. For example, the execution may be directly instructed by the OS 21 and executed, or it may be a resident auxiliary program 42. When resident, the auxiliary program 42 may perform the above-described operation in response to the execution command.

Further, in any flowchart disclosed in the illustrative embodiment, the plurality of processes in any plurality of steps can be changed to any execution order or executed in parallel as long as the processing contents do not conflict with each other.

Further, the processes disclosed in the illustrative embodiment may be executed by hardware such as a single CPU, a plurality of CPUs, an ASIC, or a combination thereof. Further, the processes disclosed in the illustrative embodiment can be achieved in various aspects such as a recording medium in which a program for executing the process is recorded, or a method.

What is claimed is:

1. A non-transitory computer-readable medium storing a support program readable by a computer of an information processing device, the support program corresponding to a printer connected to the information processing device and supporting a general-purpose print program pre-installed in an operating system of the information processing device, the support program, when executed by the computer, causes the computer to perform:
    based on a print instruction being output from an application program installed in the information processing device and transferred to the general-purpose print program to cause the printer to perform printing,
        receiving intermediate image data according to the print instruction from the operating system;
        generating rasterized raster data based on the intermediate image data received from the operating system;
        compressing the generated raster data; and
        transmitting print data based on the compressed raster data to the printer,
    wherein the support program, when executed by the computer, further causes the computer to perform:
        obtaining capability information from the printer, the capability information indicating a capability of the printer and including information indicating whether the printer has a decompression function for decompressing the print data that has undergone the compressing, and
    wherein the support program causes the computer to:
        in a case the obtained capability information indicates that the decompression function is possessed, perform the compressing; and
        in a case the obtained capability information does not indicate that the decompression function is possessed, perform causing the printer to perform the printing according to the intermediate image data obtained from the operating system without performing the compressing.

2. The non-transitory computer-readable medium according to claim 1, wherein in the causing the printer to perform the printing, the support program causes the computer to perform transmitting print data based on uncompressed raster data to the printer.

3. The non-transitory computer-readable medium according to claim 1, wherein in the causing the printer to perform the printing, the support program causes the computer to perform returning the obtained intermediate image data to the operating system to cause the operating system to which the intermediate image data is returned to transmit print data based on the intermediate image data to the printer.

4. The non-transitory computer-readable medium according to claim 1,
   wherein the capability information further includes information indicating a compression method decompressible by the printer, and
   wherein in the compressing, the support program causes the computer to perform selecting a compression method that matches the decompressible compression method indicated in the capability information from among a plurality of compression methods and compressing the generated raster data in the selected compression method.

5. A non-transitory computer-readable medium storing a support program readable by a computer of an information processing device, the support program corresponding to a printer connected to the information processing device and supporting a general-purpose print program pre-installed in an operating system of the information processing device, the support program, when executed by the computer, causes the computer to perform:
   based on a print instruction being output from an application program installed in the information processing device and transferred to the general-purpose print program to cause the printer to perform printing,
      receiving intermediate image data according to the print instruction from the operating system;
      generating rasterized raster data based on the intermediate image data received from the operating system;
      compressing the generated raster data; and
      transmitting print data based on the compressed raster data to the printer,
   wherein the support program causes the computer to:
      in a case the received intermediate image data does not satisfy a predetermined condition, perform the compressing; and
      in a case the received intermediate image data satisfies the predetermined condition, perform causing the printer to perform the printing according to the intermediate image data received from the operating system without performing the compressing.

6. The non-transitory computer-readable medium according to claim 5, wherein in the causing the printer to perform the printing, the support program causes the computer to perform transmitting print data based on uncompressed raster data to the printer.

7. The non-transitory computer-readable medium according to claim 5, wherein in the causing the printer to perform the printing, the support program causes the computer to perform returning the obtained intermediate image data to the operating system to cause the operating system to which the intermediate image data is returned to transmit print data based on the intermediate image data to the printer.

8. A non-transitory computer-readable medium storing a support program readable by a computer of an information processing device, the support program corresponding to a printer connected to the information processing device and supporting a general-purpose print program pre-installed in an operating system of the information processing device, the support program, when executed by the computer, causes the computer to perform:
   based on a print instruction being output from an application program installed in the information processing device and transferred to the general-purpose print program to cause the printer to perform printing,
      receiving intermediate image data according to the print instruction from the operating system;
      generating rasterized raster data based on the intermediate image data received from the operating system;
      compressing the generated raster data; and
      transmitting print data based on the compressed raster data to the printer,
   wherein the support program causes the computer to:
      in a case print setting based on the print instruction does not satisfy a predetermined condition, perform the compressing; and
      in a case the print setting based on the print instruction satisfies the predetermined condition, perform causing the printer to perform the printing according to the intermediate image data received from the operating system without performing the compressing.

9. The non-transitory computer-readable medium according to claim 8, wherein in the causing the printer to perform the printing, the support program causes the computer to perform transmitting print data based on uncompressed raster data to the printer.

10. The non-transitory computer-readable medium according to claim 8, wherein in the causing the printer to perform the printing, the support program causes the computer to perform returning the obtained intermediate image data to the operating system to cause the operating system to which the intermediate image data is returned to transmit print data based on the intermediate image data to the printer.

\* \* \* \* \*